United States Patent [19]

Zarembo

[11] Patent Number: 5,170,538

[45] Date of Patent: Dec. 15, 1992

[54] THEATER ROPE HOOK AND TERMINATOR

[75] Inventor: Peter J. Zarembo, Shoreview, Minn.

[73] Assignee: Minnesota Mining and Manufacturing Company, St. Paul, Minn.

[21] Appl. No.: 843,583

[22] Filed: Feb. 28, 1992

[51] Int. Cl.⁵ ............................................. F16G 11/00
[52] U.S. Cl. ................................ 24/136 R; 24/115 R
[58] Field of Search ............ 24/136 R, 136 L, 136 K, 24/115 R, 115 G, 115 H; 119/106, 117, 121

[56] References Cited

U.S. PATENT DOCUMENTS

| 147,928 | 2/1874 | Fry | 119/117 |
|---|---|---|---|
| 1,686,424 | 10/1928 | Thomson et al. | 24/136 R |
| 3,952,377 | 4/1976 | Morell | 24/136 R |
| 4,236,281 | 12/1980 | Bottum | 24/115 R |
| 4,455,717 | 6/1984 | Gray | 24/115 R |
| 4,602,891 | 7/1986 | McBride | 24/136 K |
| 4,782,560 | 11/1988 | Keller | 24/136 L |

Primary Examiner—Victor N. Sakran
Attorney, Agent, or Firm—Gary L. Griswold; Walter N. Kirn; William B. Barte

[57] ABSTRACT

A theater rope connector for terminating a fine fiber rope such as typically used in patron control. The connector comprises two injection molded plastic components, the first being formed to have a hook or other structure for attaching the connector to a suitable fixture and toothed legs for penetrating and thus securing the rope. The other component comprises a sleeve adopted to fit over the first component and thereupon press the toothed legs into the rope, securing them in place. The sleeve also has a flange at one end adapted to mate with a peripheral recess on the first component, thereby maintaining the two components in position.

3 Claims, 2 Drawing Sheets

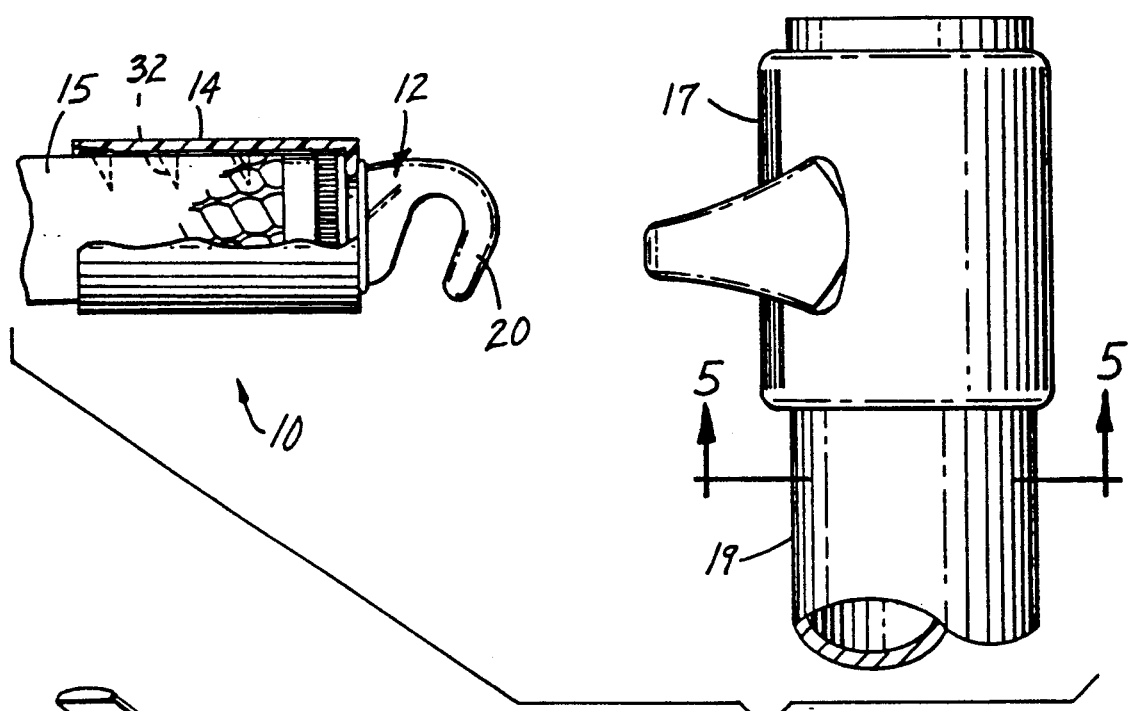
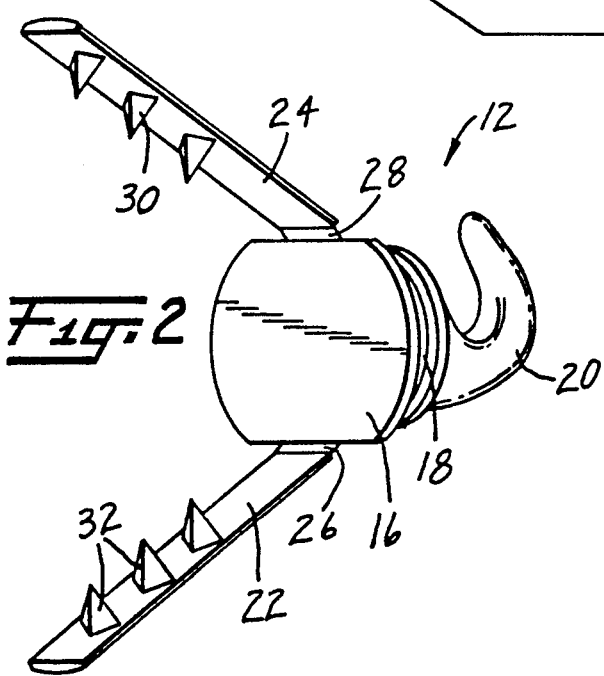
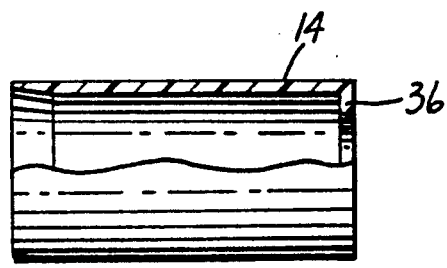

5,170,538

THEATER ROPE HOOK AND TERMINATOR

FIELD OF THE INVENTION

This invention relates to a connector adapted for use with fine fiber ropes such as those particularly used as theater ropes for patron control.

BACKGROUND OF THE INVENTION

It has long been known to secure ropes of various types to a termination device or connector wherein some form of connecting means is secured to the rope by means of an outer sleeve which presses a second member of the connector into intimate contact with the rope. Thus, for example, U.S. Pat. No. 147,928, patented Feb. 24, 1874, depicts a horse tethering device in which a hook is swivelly mounted at one end of an elongated subconnector member, and two legs are attached via hinges to the other end. Each leg contains a number of teeth which are adapted to be pressed into the rope as a sleeve positioned therearound. Such a connector assembly and others known in the art subsequent thereto all appear to be directed at providing rugged terminations of various types of wire or other heavy-duty rope assemblies. It is not known to provide a light-weight, molded plastic construction for use in less rigorous applications where a simple, convenient, field terminable connector for use with a light-weight rope such as a theater rope, is necessary, and in which the completed assembly must also be aesthetically acceptable.

SUMMARY OF THE INVENTION

The present invention is directed to a connector which remedies the above-noted problem. In the present invention, the connector comprises a theater rope connector for terminating a rope typically used for corridor control, comprising a molded plastic subassembly having a central portion including an outer perimeter having a recess extending therealong for mating with an outer sleeve, a hook or other attachment device is provided on one side of the central portion for attaching a terminated rope to pedestals, wall brackets, and like objects. At least one leg is provided on the opposite side of the central portion and extending therefrom via a living hinge. The legs have molded therein at least one tooth-like projection for securing the rope as the tooth-like projections are pressed therein. Finally, a molded sleeve is adapted to be fitted over an end of the rope to thereby press the tooth-like projections into the rope. The sleeve includes an inward projecting flange at one end for mating with the recess on the outer periphery of the subassembly, thereupon locking together the two members while the attaching hook protrudes through the flanged end of the sleeve to allow the assembled connector to be attached to an appropriate object.

BRIEF DESCRIPTION OF THE DRAWING

FIG. 1 is a partially cutaway elevational view of a preferred embodiment of the connector of the present invention;

FIG. 2 is a perspective view of a subassembly used in the connector of the present invention;

FIG. 4 is a partially cutaway view of the sleeve adapted for use with the subassembly shown in FIG. 2.

DETAILED DESCRIPTION

Figure 3:
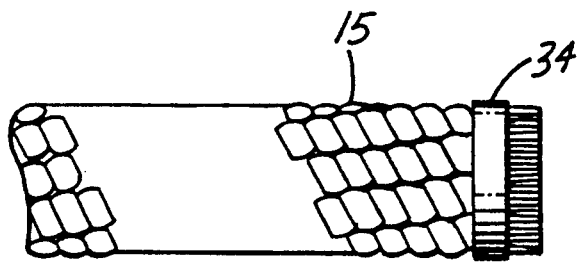
FIG. 3 is an end of a theater rope prepared for termination via the connector of the present invention.

FIG. 1 shows a fully completed connector according to the present invention. It may be there seen that the connector (10) comprises a subassembly (12), together with an outer sleeve (14) which, in combination, operates to secure therein a theater rope or the like (15).

As more clearly seen in FIG. 2, the subassembly (12) consists of a unitary injection molded plastic piece formed of rigid polystyrene or similar material, which piece includes a central portion (16), the outer periphery of which contains a recess (18) adapted to be mated with a corresponding flange in the sleeve (14). Extending from the forward end of the central portion (16) is a hook (20) or similar projection to allow the connector to be attached to a pedestal, wall bracket, or the like as may be typically utilized in lobbies and other public areas. Opposite the hook portion and extending away from the opposite side of the central portion (16) via living hinges (26 and 28) are two arms (22 and 24, respectively). Each of the arms (22 and 24) are further constructed to have inwardly directing teeth (30 and 32, respectively). The arms (22 and 24) are desirably formed in a horizontally extending direction parallel with the planar portion of the central portion of the subassembly (12), enabling the subassembly to be inexpensively injection molded out of a suitable plastic. Thereafter, the legs (22 and 24) are bent over via the living hinges (26 and 28) so as to be pressed into a suitable rope.

In FIG. 3, such a rope (15) is shown to be appropriately prepared for installation with the connector of the present invention. As there shown, such a rope may be preferably prepared by wrapping a short piece of pressure sensitive tape (34) around one piece of the rope to prevent the rope from becoming frayed prior to installation into the connector.

The remaining portion of the connector comprises a sleeve (14), as shown in both FIGS. 1 and 4. As further shown in FIG. 4, the connector (14) includes a flange (36) on one end which is adapted to be snapped over and to be secured within the recess (18) of the subassembly (12). The opposite end is preferably flared to prevent fraying of the rope.

Thus, upon assembly of the connector, the subassembly is first positioned at the end of a prepared rope and the projections on the legs are pressed into the rope. The sleeve is then passed over the hook end of the assembly and is slid over the legs and rope so as to secure the teeth pressed into the rope. It may be particularly desired to construct the legs and teeth extending inward therefrom such that either the legs are of increasing thickness extending away from the central portion and/or the teeth or barbs are of increasing height as they proceed from the inner portion such that as the sleeve is then slid over the legs, the force exerted against the legs gradually increasing, thus pressing them more securely into the rope and thereby making the connection with increased force. Finally, the sleeve is forced so that the flange thereon passes into the recess on the central portion, completing the assembly.

In an alternative embodiment, the sleeve (14) may be first slid over the rope (15), allowing a portion of the rope to extend through the flange (36). The subassembly (12) may then be positioned so that the middle portion (16) of the subassembly is butted up against the end of the rope and the two legs (22 and 24) brought along against the rope so that the projecting teeth (30 and 32) are pressed into the rope. The sleeve (14) may then be slid back toward the end of the rope to clamp the legs pressed in the rope. The sleeve is then further slid over the subassembly (12) until the flange (36) is snapped into the recess (18).

The above-described connector, as may be readily appreciated, is both extremely inexpensive to produce as injected molding from inexpensive plastic and yet is aesthetically pleasing and readily installed in field installations while not having exposed screws or other attachment means to detract from its appearance. It may also be appreciated that the hook (20), as shown in FIGS. 1 and 2, may be formed as an eyelet or other type of an attaching means and may be similarly formed as a swivel member which is molded as a separate item and thereafter snapped into an appropriate opening in the subassembly.

Figure 5:
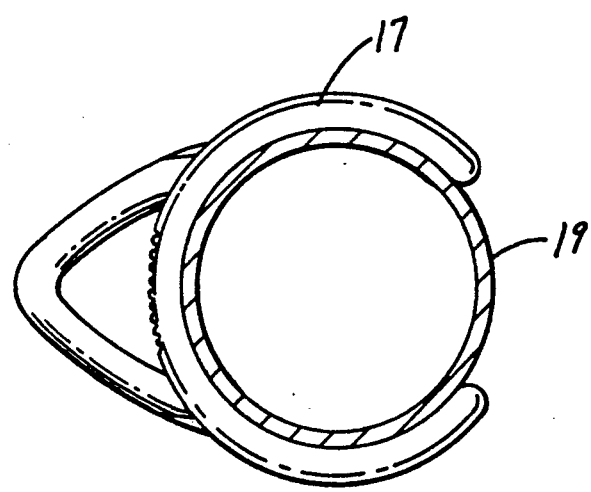
FIG. 5 is a cross-section of the preferred embodiment taken along line 5—5 of FIG. 1.

The connector of the present invention is particularly adapted for use in patron control applications such as encountered in electronic article surveillance systems installations. In such locations, it is frequently required that access restrictions be easily defeated in case of an emergency such as fire or the like. Accordingly, the connector may be constructed to allow separation of the rope from the connector upon application of a prescribed force. In a still further preferred embodiment, the connector is used with a mating bracket such as the pedestal bracket (19) shown in FIGS. 1 and 5. The bracket there shown is provided with a loop adapted to receive the hook (20), and is further made so as to allow it to be snapped over a post (19), rather than requiring it to be slid over the top thereof. More importantly, the snap-on feature also allows it to snap off upon application of a prescribed force, thus satisfying fire regulations and the like.

What is claimed is:

1. A theater rope connector for terminating a rope typically used for corridor control, comprising
   a) a molded plastic subassembly having
      (i) a central portion including an outer, substantially circular perimeter having a recess extending therearound for mating with an outer sleeve,
      (ii) means on a distal side of said central portion adapted to attach a said terminated rope to pedestals, wall brackets, and like objects, and
      (iii) means on the opposite side of said central portion and extending therefrom via a living hinge, including at least one leg into which is molded at least one tooth-like projection for securing a said rope as said tooth-like projections are pressed into a said rope, and
   b) a substantially cylindrical molded sleeve adapted to be fitted from the distal end over said central portion, and said at least one leg to thereupon press said tooth-like projections into a said rope and having an inward projecting flange at one end for mating with the recess on the outer periphery of the subassembly for thereupon locking together the two members while the attaching means protrudes through said flanged end of the sleeve to allow the assembled connector to be attached to an appropriate object.

2. A connector according to claim 1, wherein said attaching means includes a hook-shaped projection.

3. A connector according to claim 1, including at least two legs extending from said central portion via living hinges, each leg having a plurality of said tooth-like projections.

* * * * *